United States Patent
Sugiyama et al.

(10) Patent No.: US 8,155,968 B2
(45) Date of Patent: Apr. 10, 2012

(54) VOICE RECOGNITION APPARATUS AND METHOD FOR PERFORMING VOICE RECOGNITION COMPRISING CALCULATING A RECOMMENDED DISTANCE RANGE BETWEEN A USER AND AN AUDIO INPUT MODULE BASED ON THE S/N RATIO

(75) Inventors: Hiroshi Sugiyama, Kawasaki (JP); Kaoru Suzuki, Yokohama (JP); Daisuke Yamamoto, Kawasaki (JP); Toshiyuki Koga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 488 days.

(21) Appl. No.: 12/370,133

(22) Filed: Feb. 12, 2009

(65) Prior Publication Data
US 2009/0210227 A1    Aug. 20, 2009

(30) Foreign Application Priority Data

Feb. 15, 2008    (JP) .................................. 2008-035126

(51) Int. Cl.
 G10L 11/00    (2006.01)
 G10L 15/20    (2006.01)
 G01L 17/00    (2006.01)

(52) U.S. Cl. .......................... 704/270; 704/233; 704/246

(58) Field of Classification Search .......................... None
See application file for complete search history.

(56) References Cited

U.S. PATENT DOCUMENTS

| | | | |
|---|---|---|---|
| 7,031,917 B2 * | 4/2006 | Asano | 704/238 |
| 2006/0143017 A1 | 6/2006 | Sonoura et al. | |
| 2006/0195598 A1 * | 8/2006 | Fujita et al. | 709/230 |
| 2008/0312918 A1 * | 12/2008 | Kim | 704/233 |

FOREIGN PATENT DOCUMENTS

| | | |
|---|---|---|
| CN | 1370387 A | 9/2002 |
| EP | 1202603 A1 | 5/2002 |
| JP | 06-236196 | 8/1994 |
| JP | 2877350 | 1/1999 |
| JP | 2000-089787 | 3/2000 |
| JP | 2004-226656 | 8/2004 |
| JP | 2004230480 A * | 8/2004 |
| JP | 2006-181651 | 7/2006 |
| JP | 2006-227499 | 8/2006 |
| WO | 2005/013263 | 2/2005 |

OTHER PUBLICATIONS

Chinese Office Action for Application No. 200910007438.1 Mailed on Dec. 21, 2010.
Japanese Office Action for Japanese Application No. 2008-035126 issued on Jan. 6, 2012.

* cited by examiner

*Primary Examiner* — Matthew Sked
(74) *Attorney, Agent, or Firm* — Turocy & Watson, LLP

(57) ABSTRACT

A voice recognition apparatus includes: a voice recognition module that performs a voice recognition for an audio signal during a voice period; a distance measurement module that measures a current distance between the user and an voice input module; a calculation module that calculates a recommended distance range, in which being estimated that an S/N ratio exceeds a first threshold, based on the voice characteristic; and a display module that displays the recommended distance range and the current distance.

8 Claims, 10 Drawing Sheets

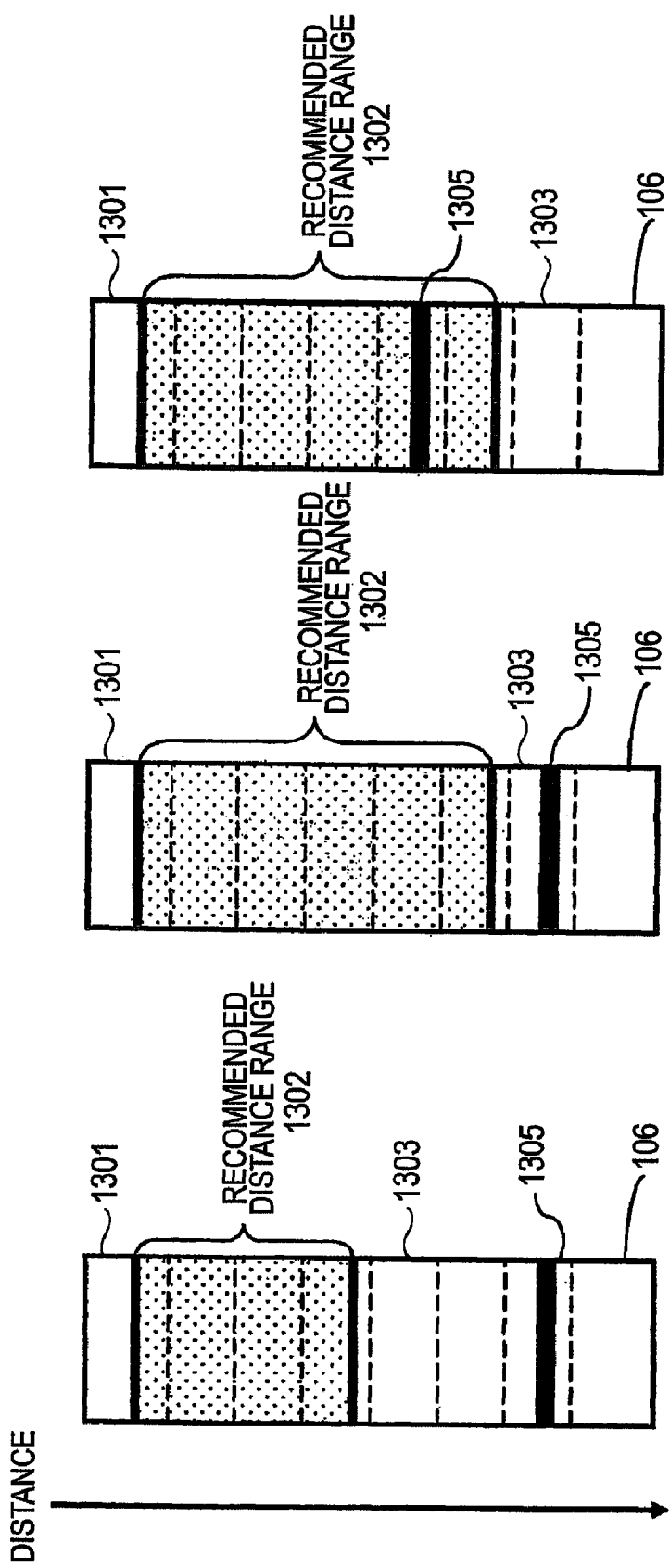

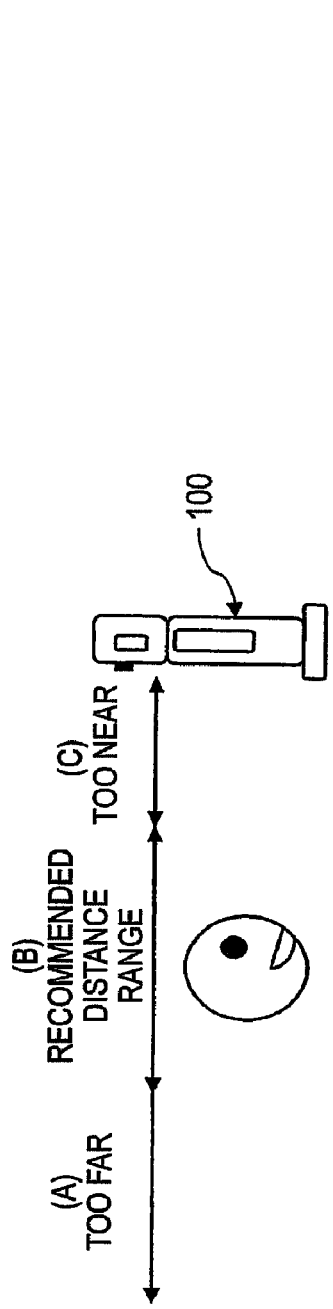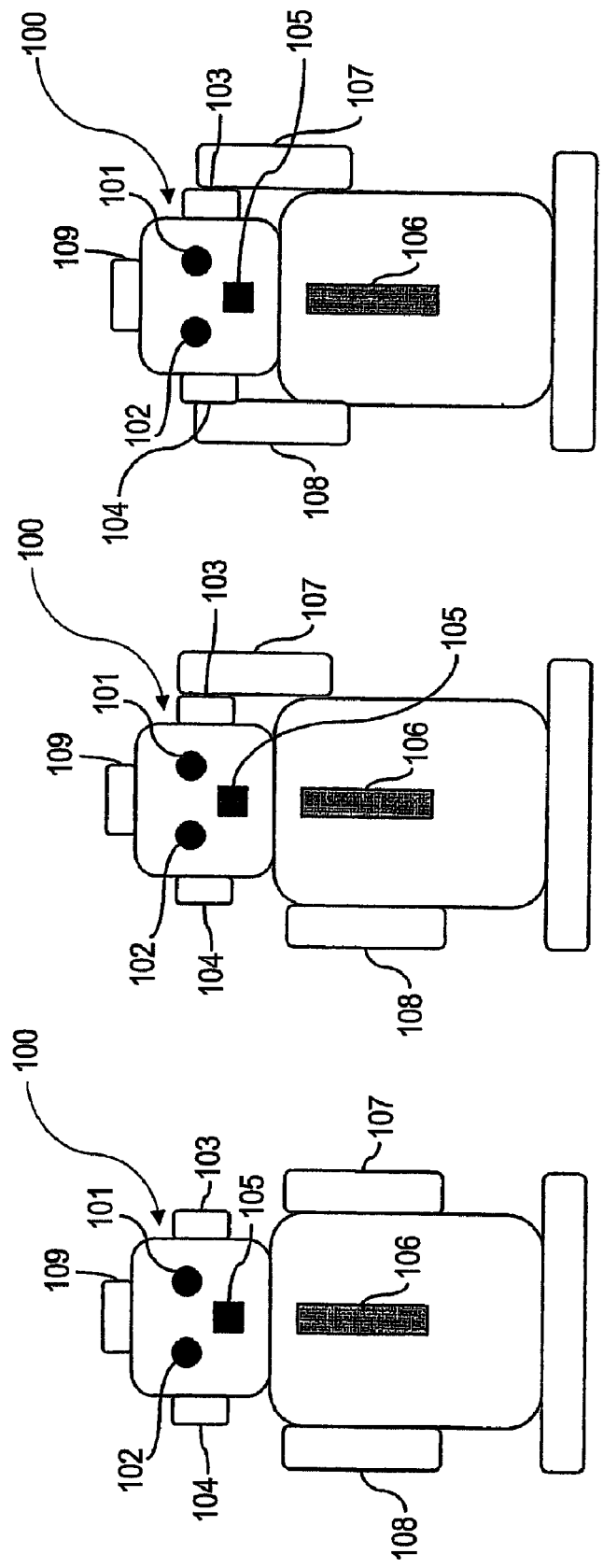
FIG.14A    FIG.14B    FIG.14C

VOICE RECOGNITION APPARATUS AND METHOD FOR PERFORMING VOICE RECOGNITION COMPRISING CALCULATING A RECOMMENDED DISTANCE RANGE BETWEEN A USER AND AN AUDIO INPUT MODULE BASED ON THE S/N RATIO

CROSS-REFERENCE TO THE RELATED APPLICATION(S)

The present disclosure relates to the subject matters contained in Japanese Patent Application No. 2008-035126 filed on Feb. 15, 2008, which are incorporated herein by reference in its entirety.

FIELD

The present invention relates to a voice recognition apparatus and a method for performing a voice recognition.

BACKGROUND

Conventionally, there has been known a robot that performs voice interaction with a user, which is called a voice interactive robot. However, the voice interactive robot may not correctly recognize a voice made by the user in some cases due to noise output from various equipments in actual environment such as in a home or in an office. To improve a voice recognition rate in the environment where the noise is output by home appliances or by the user's action, it is preferable to input the voice by the user into a microphone at an appropriate level.

There has been proposed a method for improving a S/N ratio by calculating the S/N ratio when the user's voice is detected and by moving the robot toward the user when the S/N ratio is lower than a given value. An example of such method is disclosed in JP-A-2006-181651 (counterpart U.S. publication is: U.S. 2006/0143017 A1). However, according to this method, it is not determined how much the robot needs to move closer to the user for receiving the voice satisfying the S/N ratio sufficient for the voice recognition. Further, when the surrounding noise level is changed, it is required to receive another voice from the user to determine whether or not the distance to the user is appropriate.

There has been proposed a method for indicate to the user an actual voice level and a desired voice level comparatively in accordance with the surrounding noise level to allow the user to intuitively know the desired volume of the voice. An example of such method is disclosed in JP-A-2006-227499. However, a large amount of the voice by the user is heard to the user through a brainpan of the user. Therefore, it is difficult for the user to adjust the volume of the voice in accordance with the indication made by the robot. Also, when the surrounding noise level is changed, the user is required to perform the voice again in order to receive the voice in an appropriate level range.

The above described conventional methods employ a method in which the user's voice level is adjusted through multiple voicees made by the user. Hence, those methods require the user to perform the voice again every time the adjustment is required due to the change in environment such as the change in the surrounding noise level.

SUMMARY

According to an aspect of the invention, there is provided a speech recognition apparatus including: an audio input module that receives an audio input and outputs an audio signal, the audio input module having a gain being configured to be adjustable; a voice recognition module that detects a voice period, where a voice activity by a user is detected, in the audio signal and performs a voice recognition for the audio signal during the voice period; a first level measurement module that measures a voice level of the audio signal in the voice period and outputs the voice level; a second level measurement module that measures a noise level of the audio signal in a noise period and outputs the noise level, the noise period being a time period except the voice period; a first calculation module that calculates an S/N ratio that is a ratio of the voice level to the noise level; a distance measurement module that measures a current distance between the user and the voice input module; a first memory module that stores a first threshold corresponding to an S/N ratio at which the voice recognition module is capable to perform the voice recognition with a given recognition rate; a second memory module that stores a voice characteristic having a set of the voice level, the current distance and the gain, by which the voice recognition module has succeeded in performing the voice recognition; a second calculation module that calculates a recommended distance range for the current distance, in which being estimated that the S/N ratio exceeds the first threshold, based on the voice characteristic; and a display module that displays the recommended distance range and the current distance.

According to an another aspect of the invention, there is provided a method for performing a voice recognition, the method including: receiving an audio input to output an audio signal with a gain being configured to be adjustable; detecting a voice period, where a voice activity by a user is detected, in the audio signal to perform the voice recognition for the audio signal during the voice period; measuring a voice level of the audio signal in the voice period to output the voice level; measuring a noise level of the audio signal in a noise period to output the noise level, the noise period being a time period except the voice period; calculating an S/N ratio that is a ratio of the voice level to the noise level; measuring a current distance from the user; storing a first threshold corresponding to an S/N ratio at which the voice recognition is capable to be performed to have a given recognition rate; storing a voice characteristic having a set of the voice level, the current distance and the gain, by which the voice recognition has been succeeded; calculating a recommended distance range for the current distance, in which being estimated that the S/N ratio exceeds the first threshold, based on the voice characteristic; and displaying the recommended distance range and the current distance.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 13 is a view showing an example for displaying a recommended voice distance on an indicator.

FIG. 14 is a view showing an example of notifying whether or not the user is within the recommended voice distance by action of arms of the voice interactive robot.

DETAILED DESCRIPTION OF THE EMBODIMENTS

Figure 1:
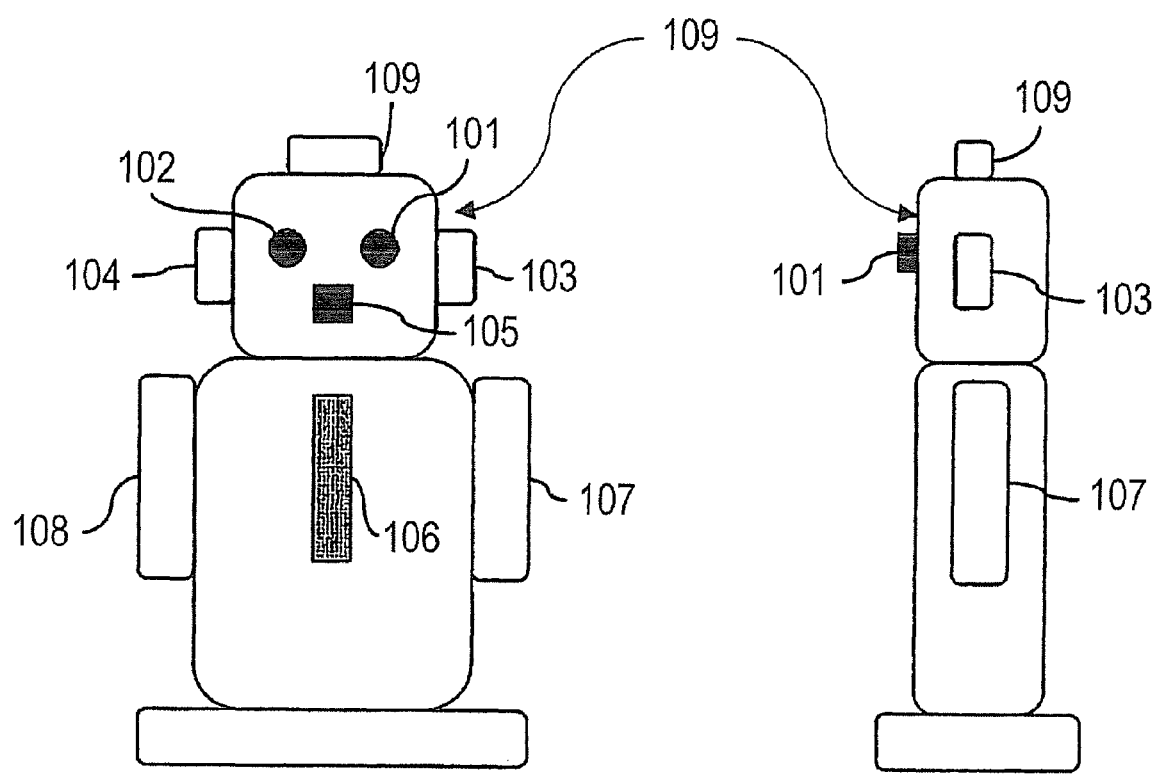
FIG. 1 is a view showing an appearance of a voice interactive robot according to a first embodiment of the invention.

Hereinafter, embodiments of the invention will be described with reference to the drawings. In the following description, the same or similar components will be denoted by the same reference numerals, and the duplicate description thereof will be omitted.

First Embodiment

A voice interactive robot according to a first embodiment will be described in below.

FIG. 1 is a view showing an appearance of the voice interactive robot according to the first embodiment. The voice interactive robot 100 is for home use and provided with image pickup devices 101 and 102 (e.g., CCD cameras), voice input devices 103 and 104 (e.g., microphones), a distance sensor 105, a remote control signal transmitter/receiver 109, an indicator 106, and movable members 107 and 108 (e.g., robot arms).

The voice input devices 103 and 104 are disposed at a head part of the voice interactive robot 100 and converts a user's voice (voice) into an analog signal. The converted analog signal is amplified through a microphone amplifier having gain adjustment function, converted into a digital signal through an A/D converter, which is not shown, and processed as voice data by a processor, which is not shown.

The distance sensor 105 is a device for measuring the distance to an object and outputting a signal indicating the distance. The distance sensor 105 may be an infrared range sensor or an ultrasonic range sensor. The distance sensor 105 is disposed near the voice input device 103, and used to measure the distance between the user and the voice input devices 103 and 104.

The indicator 106 is disposed on a front face of a body of the robot 100. The indicator 106 is a display device, such as an LED and a liquid crystal panel, for displaying information that changes over time to the user. In the first embodiment, the indicator 106 is used to display recommended voice distance and the distance between the user and the voice interactive robot 100 to the user.

The remote control signal transmitter/receiver 109 is a device for transmitting or receiving a remoter control signal for operating a home electrical appliance. The remote control signal transmitter/receiver 109 receives a signal (e.g., infrared code) sent from a remote controller operated by the user. Also, the remote control signal transmitter/receiver 109 operates the home electrical appliance, for example, a television set 203, by sending a given signal (e.g., infrared code) in accordance with an instruction spoken by the user.

The movable members 107 and 108 are components for enabling the voice interactive robot 100 to represent an action. By the action of the movable members 107 and 108, a determination result of whether or not the user is within the recommended distance range, which is a distance range suitable for voice, is notified to the user.

Figure 2:
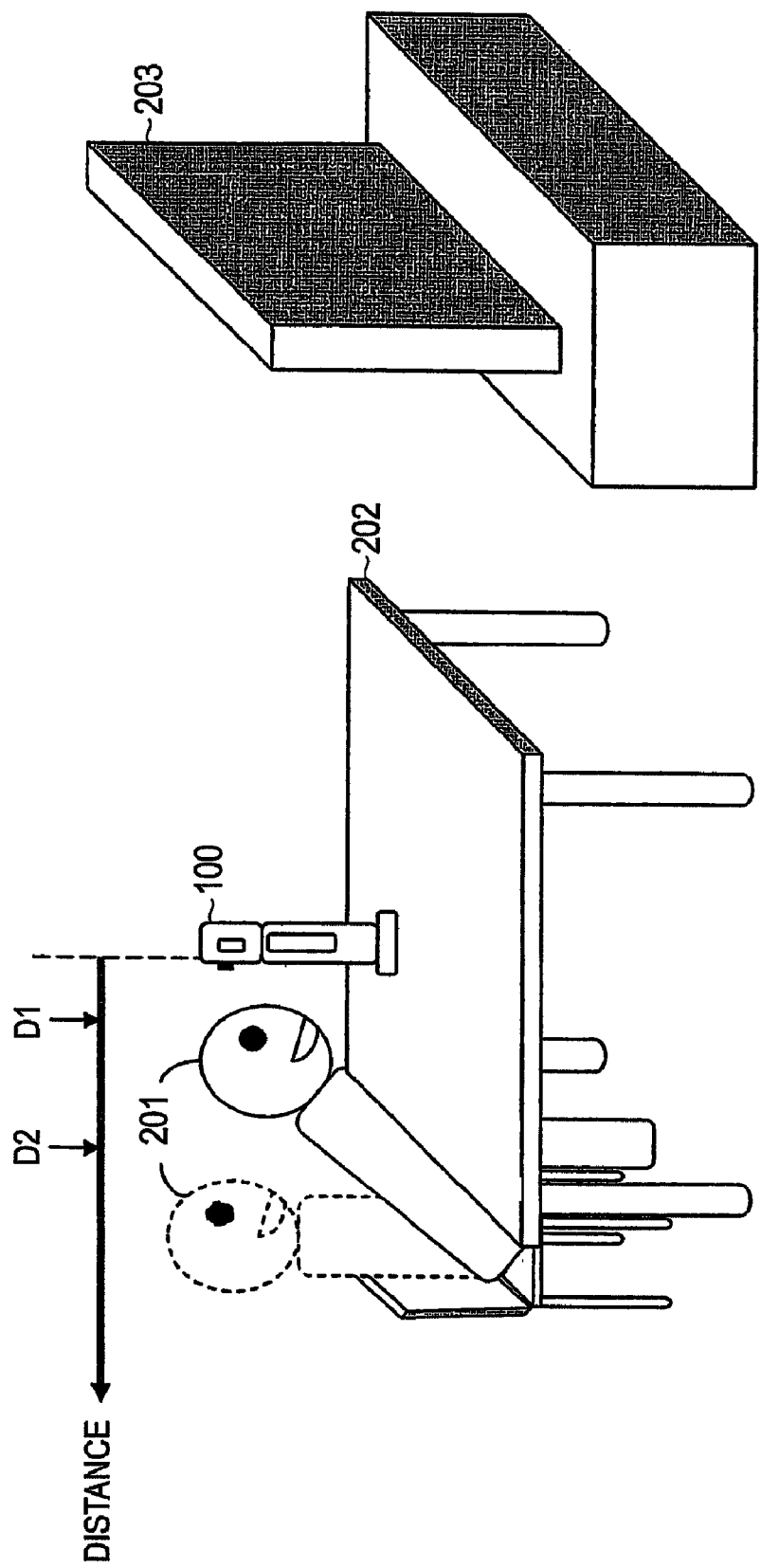
FIG. 2 is a view showing an example of a usage of the voice interactive robot according to the first embodiment.

FIG. 2 is a view showing a usage of the voice interactive robot according to the first embodiment.

The voice interactive robot 100 may be used by being placed on a dining table 202, and the user 201 speaks an instruction vocabulary to the voice interactive robot 100.

For example, the user 201 speaks an instruction vocabulary "Turn on the television", and the voice interactive robot 100 recognizes by the voice recognition the instruction to "turn on the television". The voice interactive robot 100 sends a remote control signal from the remote control signal transmitter/receiver 109, and turns on the power of the television set 203. It is supposed that before turning on the television set 203, the user 201 speaks to the voice interactive robot 100 from the distance of D2 shown in FIG. 2. In a state where the television set 203 is on, the sound of the television set 203 becomes a noise to increase the noise level, so that the S/N ratio of the spoken voice to the noise is decreased.

When the user 201 performs the voice at a constant volume, the user 201 has to approach the voice interactive robot 100 up to the distance D1, which is smaller than D2 as shown in FIG. 2, before performing the voice to increase the S/N ratio. In the first embodiment, the distance range between the voice interactive robot 100 and the user 201 at which the voice recognition rate is more than a certain value is estimated according to the surrounding noise level.

The estimated recommended distance range and the distance between the user 201 and the voice interactive robot 100 measured by the distance sensor 105 are notified to the user 201. Thereby, the user 201 knows whether or not the user 201 is positioned within the recommended distance range, which is suitable for voice depending on the noise level, and how much the user 201 needs to move toward the voice interactive robot 100 to be within the recommended distance range. In this way, it is possible to support the user to move into the distance range suitable for performing the voice for the voice recognition to satisfy a desired accuracy.

FIG. 13 is a view showing an example of the indicator 106 notifying the recommended distance range suitable for voice and the distance between the user 201 and the voice interactive robot 100 to the user 201.

The indicator 106 notifies the current distance to the user with a bar 1305. The indicator 106 also notifies the recommended distance range 1302 between the voice interactive robot 100 and the user to notify the voice recommendation distance to the user.

As shown in section (1) in FIG. 13, the indicator 106 indicates the recommended distance range 1302, the distance range 1301 in which the distance to the user 203 is too near, the distance range 1303 in which the distance to the user is too far, and the current distance to the user 203 with the bar 1305. As shown in section (1) in FIG. 13, the user 203 is not within the recommended distance range 1302, but the distance to the voice recognition apparatus 100 is too far.

Section (2) in FIG. 13 shows an example of the display of the indicator 106 when the surrounding noise level changes from the state shown in section (1) in FIG. 13. As the surrounding noise changes, the recommended distance range 1302 is varied.

Section (3) in FIG. 13 shows an example of the display of the indicator 106 when the distance between the user 203 and the voice interactive robot 100 is changed from the state shown in section (2) in FIG. 13. Since the distance between the user 203 and the voice interactive robot 100 is shorter, the user 203 is positioned within the recommended distance range.

FIG. 14 is a view showing an example of the voice interactive robot 100 notifying whether or not the user is within the recommended distance range 1302 with the action of the movable members 107 and 108. The upper view shows the distance relationship between the user and the voice interactive robot 100. The lower views show the action of the movable members 107 and 108 when the voice interactive robot 100 determines that the user is positioned within the respective distances (a), (b) and (c).

In the case (a), where the distance to the user is too far, the movable members 107 and 108 is positioned in an initial position, and are kept down. In the case (b), where the distance to the user is determined to be within the appropriate recommended distance range, one of the movable members, the movable member 107, is raised upward. In the case (c), where the distance to the user is too near, both the movable members 107 and 108 are raised upward.

Herein, it is possible to notify whether or not the distance to the user is appropriate with a combination pattern of the action of two movable members 107 and 108.

A mechanism for enabling the voice interactive robot 100 according to the first embodiment to estimate the recommended distance range will be described below.

Figure 3:
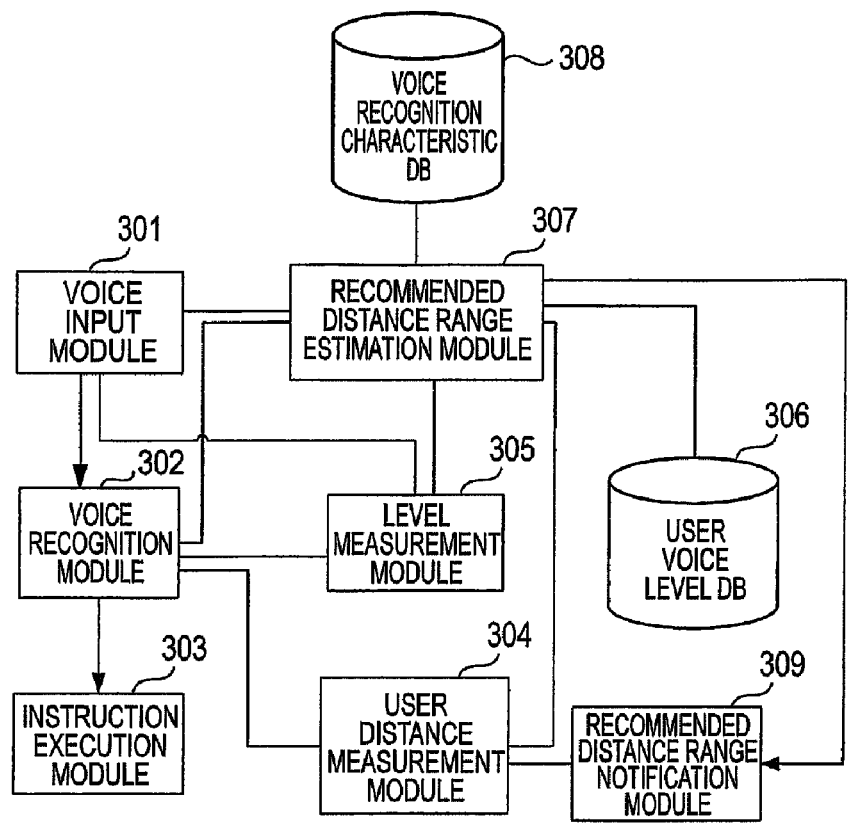
FIG. 3 is a functional block diagram of the voice interactive robot according to the first embodiment.

FIG. 3 is a functional block diagram of the voice interactive robot 100 according to the first embodiment.

The voice interactive robot 100 according to the first embodiment has a voice input module 301, a voice recognition module 302, an instruction execution module 303, a level measurement module 305, a user voice level database (hereinafter denoted as DB) 306, a recommended distance range estimation module 307, a voice recognition characteristic DB 308, and a recommended distance range notification module 309.

The voice input module 301 is a module for receiving an audio input (sound surrounding the voice interactive robot 100) and amplifying the sound at a given gain value to output an audio signal. The voice input module has the voice input devices 103 and 104, a microphone amplifier capable of gain adjustment and an A/D converter, as shown in FIG. 1. The audio signal is output to the voice recognition module 302 and the level measurement module 305.

The voice recognition module 302 performs the voice recognition for the audio signal output from the voice input module 301. The voice recognition module 302 performs a detection process for a voice period (VAD:Voice Activity Detection ) and a recognition process for determining the vocabulary in the detected voice period by performing frequency analysis or pattern matching. The shape of a voice pattern extracted through a noise removal process and the shape of a registered voice pattern of instruction voice are collated one by one. And the shape of the voice pattern at the highest matching accuracy is recognized as the voice contents. If the matching accuracy does not exceed a certain threshold, the voice recognition is determined to fail, considering that the voice pattern is not matched with any registered voice.

The instruction execution module 303 is a module for performing a process according to the instruction if the vocabulary recognized by the voice recognition module 302 is the instruction vocabulary corresponding to the instruction executable by the voice interactive robot 100. For example, if the instruction vocabulary of "Turn on the television" as previously described is recognized, the instruction execution module 303 performs a process for sending the corresponding infrared code from the remote control transmitter/receiver 109.

The user distance measurement module 304 is a module for measuring the current distance between the user 201 and the voice interactive robot 100, using the distance sensor 105 as shown in FIG. 1. The start timing at which the voice recognition module 302 starts to detect the voice period and the end timing in successive operations are event notified, and the average value of output of the distance sensor 105 in the voice period at every fixed time interval is output as the distance to the user 201 to the recommended distance range estimation module 307 and the recommended distance range notification module 309.

The level measurement module 305 measures the level of audio signal acquired from the voice input module 301. The voice recognition module 302 detects a start timing and an end timing of the voice period and outputs the start timing and the end timing as events to the level measurement module 305. The interval from the notification of starting the detection to the notification of ending the detection is determined as the voice period, and the other interval as a noise period. For the voice period, the level of audio signal within the interval is calculated and output to the recommended distance range estimation module 307. Moreover, for the noise period, the level of audio signal is calculated by dividing the interval for every given period of time, and output as the level of noise to the recommended distance range estimation module 307.

The user voice level DB 306 stores the correlation of user's voice characteristic having a set (G, D, V) of the gain G when the recognition is successful, the distance D between the user 201 and the voice interactive robot 100 and the voice level V.

The voice recognition characteristic DB 308 stores the numerical values of the voice recognition performance for the voice recognition module 302. More specifically, it stores the upper limit of allowable noise level, the lower limit of voice level of voice recognition object, and the correlation between the S/N ratio and the voice recognition rate.

The recommended distance range estimation module 307 makes the adjustment of the gain of audio signal, the estimation of the voice distance range satisfying the S/N ratio suitable for voice authentication, and the output of the estimated recommended distance range. Using (1) the gain of the voice input module 301, (2) the level of noise measured by the level measurement module 305, (3) a set (G, D, V) referred to from the user voice level DB 306, and (4) the characteristic value of the voice recognition module 302 referred to from the voice recognition characteristic DB 308, it is determined whether or not a change of the gain is required for the current noise level. If the change of the gain is required, the new gain is determined, and the voice input module 301 is instructed to adjust the gain. Then, the voice recognition module 302 estimates the S/N ratio required to exhibit the voice recognition rate of a certain value or more for the determined gain and level of noise. The recommended distance range for the required S/N ratio or more is estimated from the voice level of the user 201, and the estimated recommended distance range is output to the recommended distance range notification module 309. The specific methods for determining the gain and estimating the distance will be described later.

The recommended distance range notification module 309 presents the recommended distance range between the voice interactive robot 100 and the user 201 capable of voice recognition notified from the recommended distance range estimation module 307 to the user 201. The notification of whether or not the user 201 is positioned within the recommended distance range to the user 201 may be made by the notification by the indicator 106 or by the notification by the action of the movable members 107 and 108. The voice interactive robot 100 may be provided with a voice synthesis module that outputs synthetic voice causing the voice interactive robot 100 to speak, thereby notifying the user. Or the voice synthesis means may provide a function of enabling the voice interactive robot 100 to speak.

Figure 4:
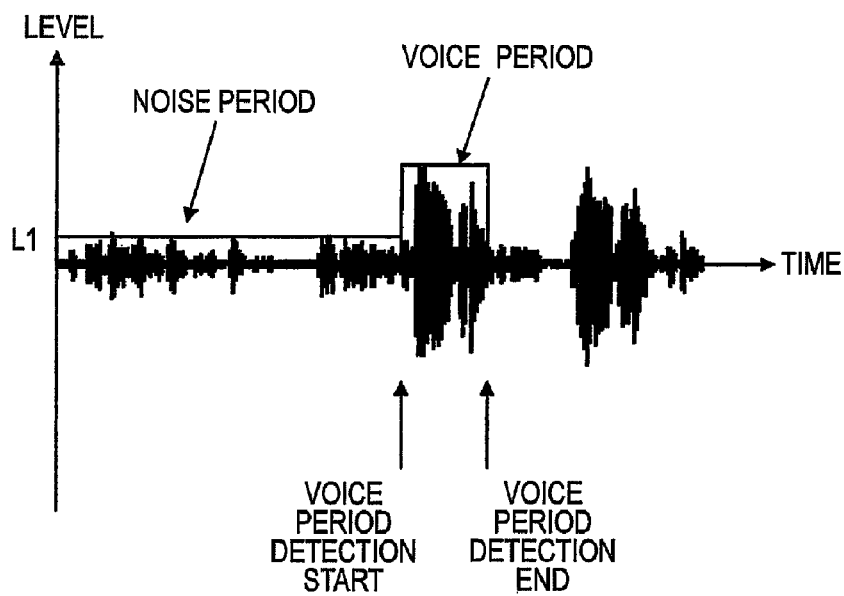
FIG. 4 is a view showing an example of sound characteristic in determining a voice period and a noise period included in an audio signal input to he voice interactive root.

FIG. 4 is a view showing an example of the sound characteristic when the level measurement module 305 determines the voice period and the noise period in the input audio signal. As shown in FIG. 4, the level measurement module 305 determines a time period where the signal level of the input audio signal is equal to or lower than a given level L1 as the noise period, and determines the time period except the noise period as the voice period. In other words, the level measurement module 305 determines the occurrence of the voice period from a detection start point at which a start of the voice is detected to a detection end point at which an end of the voice is detected, and determines other time periods as the noise period. For the voice period, the level is calculated from the audio signal within the voice period, and notified as the level of the voice to the recommended distance range estimation module 307 and the user voice level DB 306. For the noise period, the average level of audio signal is calculated by dividing the signal level of the audio signal during the noise period for every given time periods and notified as the level of noise to the recommended distance range estimation module 307.

In this description, the term "voice period" is used to describe a time period where an occurrence of the voice by the user is detected in the signal output from the voice input module 301, and the term "noise period" is used to describe a time period where the occurrence of voice is not detected. The terms "voice period" and "noise period" do not suggest any kind of periodic occurrence of the voice or noise.

Next, the relationship between the numerical value indicating the characteristic of voice recognition in the voice recognition module 302 and the process of voice recognition in the voice recognition module 302 stored in the voice recognition characteristic DB 308 will be described below.

A voice recognition process in the voice recognition module 302 is basically classified into two stages of a voice period detection process for detecting the voice period of the user from the input audio signal and a recognition process for identifying the spoken vocabulary from the audio signal in the detected voice period.

The causes that deteriorate the voice recognition performance can be analyzed at these two processing stages. One of the causes is due to the high level of noise, so that the range containing the noise before and after the voice period is falsely detected as the voice period. Another of the causes is that the degree of similarity calculated through the recognition process is decreased when the noise signal is superposed on the signal in the voice period because the S/N ratio is lower than necessary to satisfy the demanded recognition rate. If the degree of similarity is low, the signal is below a threshold for determination reference to fail in the determination, or determined as the wrong vocabulary.

The voice recognition characteristic DB 308 stores the following four parameters of the items (a) to (d) as listed below, which are required to enable the voice recognition module 302 to perform the voice recognition process.

(a) S/N ratio required to satisfy the demanded recognition rate: SN1

(b) Upper limit of noise level to suppress the false detection of voice period: L1

(c) Lower limit of voice level required to correctly detect the voice period for the voice in the voice period detection: L2

(d) Upper limit of signal level that can be correctly converted into digital signal from the maximum reference voltage of the A/D converter: L3

The degree of influence having the level of noise such as L1 and L2 on the voice recognition module 302 can be simulated on a computer, using voice data and noise data that are prepared beforehand.

The voice input module 301 has the voice input devices 103 and 104, the microphone amplifier capable of gain adjustment and the A/D converter, as described with reference to FIG. 1, whereby L3 is determined with the function of the voice input module 301.

Figure 6:
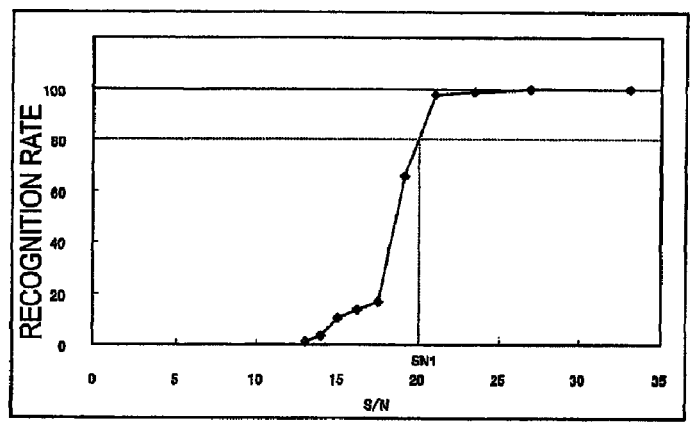
FIG. 6 is a view showing the correlation between S/N ratio and voice recognition rate.

FIG. 6 is a view showing an example of the correlation between the S/N ratio and the voice recognition rate. This graph represents the correlation between the S/N ratio and the voice recognition rate, obtained by inputting an audio signal in which noise data is superposed on the voice data at varied ratio and performing the voice recognition process. In a system using the voice recognition, the recognition performance (voice recognition rate) demanded for the voice recognition can be determined beforehand as the required specification according to a way of how the voice recognition result is used in the system. For example, in a case where the instruction execution module 303 performs the operation for a television apparatus, the required specification includes the voice recognition rate of 80% or more. In this case, SN1 that is the S/N ratio required to satisfy the demanded recognition rate is determined as 20 dB or more from FIG. 6. Such correlation between the S/N ratio and the voice recognition rate is stored in the voice recognition characteristic DB 308.

Figure 5:
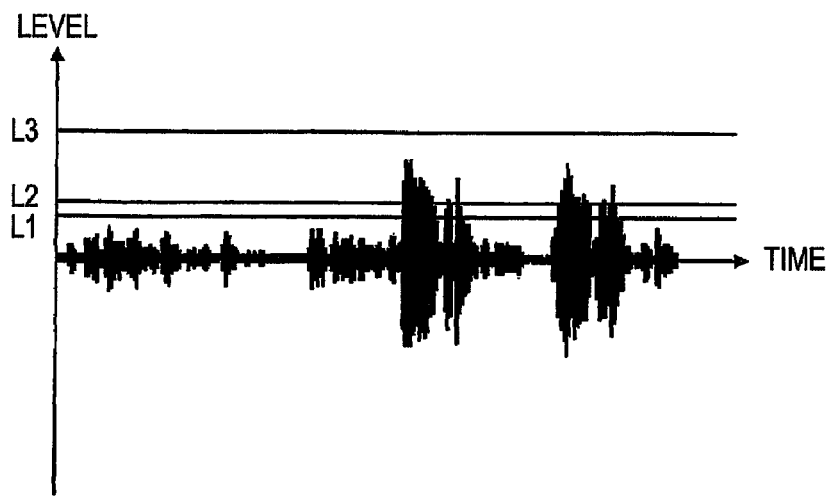
FIG. 5 is a view showing the upper limit of noise level and the lower limit and upper limit of voice level stored in voice recognition characteristic database.

FIG. 5 is a view showing the upper limit L1 of noise level and the lower limit L2 and upper limit L3 of voice level stored in the voice recognition characteristic DB 308 of the first embodiment.

Based on the numerical values of the above items (a) to (d) stored in the voice recognition S/N characteristic DB 308, the control is performed to satisfy the following three requirements:

(1) Adjusting the gain so that the noise level becomes below L1;

(2) Adjusting the gain or estimating the recommended distance from the microphone of the user 201 so that the voice level may be from L2 to L3; and (3) Estimating the recommended distance from the microphone of the user 201 so that the S/N ratio may be SN1 or more. By notifying the recommended distance range suitable for voice satisfying the items (2) and (3) to the user 201, the audio signal satisfying the demanded voice recognition rate can be supplied to the voice recognition module 302, thereby fully exhibiting the voice recognition performance.

Referring to FIGS. 6 to 10, a method for estimating the recommended distance range satisfying the items (2) and (3) will be described below.

The relationship between the voice level and the distance from the microphone to the user 201 will be described below.

Since the voice spoken by the user 201 is regarded as a point voice source, the voice level is in inverse proportion to the square of propagation distance. The gain of the voice input module 301 can be adjusted linearly with the level. Assuming that the gain of the voice input module 301 is G, the detection distance of the user distance measurement module 304 is D, and the voice level measured by the level measurement module 305 is V where the voice recognition module 302 is successful in recognition, the voice level Vi output from the voice input module 301 where the gain is Gi and the detection distance is Di can be obtained from the following Expression (1).

$$Vi = V \times (Gi/G) \times (D/Di)^2 \quad (1)$$

Accordingly, the distance Di where the voice level is Vi can be obtained from the following Expression (2).

$$Di = Sqrt\,((V/Vi) \times (Gi/G)) \times D \quad (2)$$

Accordingly, the voice level from the voice distance can be calculated at the current gain value by measuring and storing a set (G, D, V) when the recognition is successful. Moreover, the recommended distance range can be estimated from the voice level. The set (G, D, V) for the user 201 is recorded in the user voice level DB 306.

Figure 7:
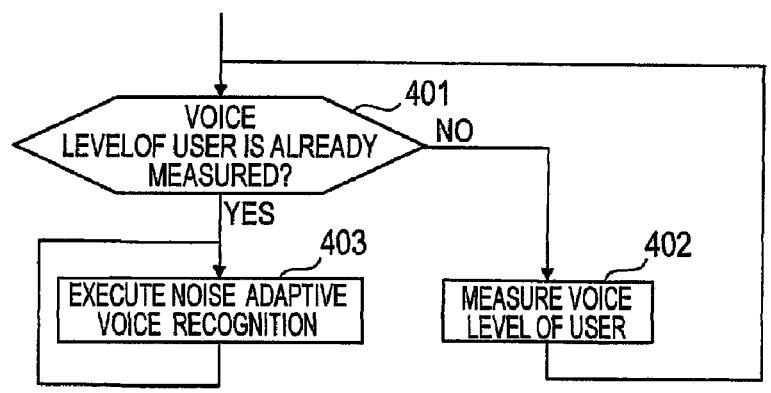
FIG. 7 is a flowchart showing a process performed by a recommended distance range estimation module.

FIG. 7 is a flowchart showing the operation of the voice interactive robot according to the first embodiment.

When the voice interactive robot 100 is activated, the following process is started.

In Step 401, a determination is made whether or not the voice level of the user 201 is already measured. If the voice level information of the user 201 is not registered by referring to the user voice level DB 306, the process proceeds to step 402, or if the voice level information is registered, the process proceeds to step 403.

In Step 402, the voice level of the user 201 is measured to record the obtained set (G, D, V) in the user voice level DB 306, and the process returns to step 401.

In Step 403, the gain adjustment according to the noise level and the suitable distance calculation from the microphone are made using the voice level information V of the user 201, and the distance information is notified to the recommended distance range notification module 309. The voice recognition adaptive to the surrounding noise is performed at step 403 until there is a stop signal of the apparatus. If there is a stop signal, the operation of the voice interactive robot 100 is stopped.

Figure 8:
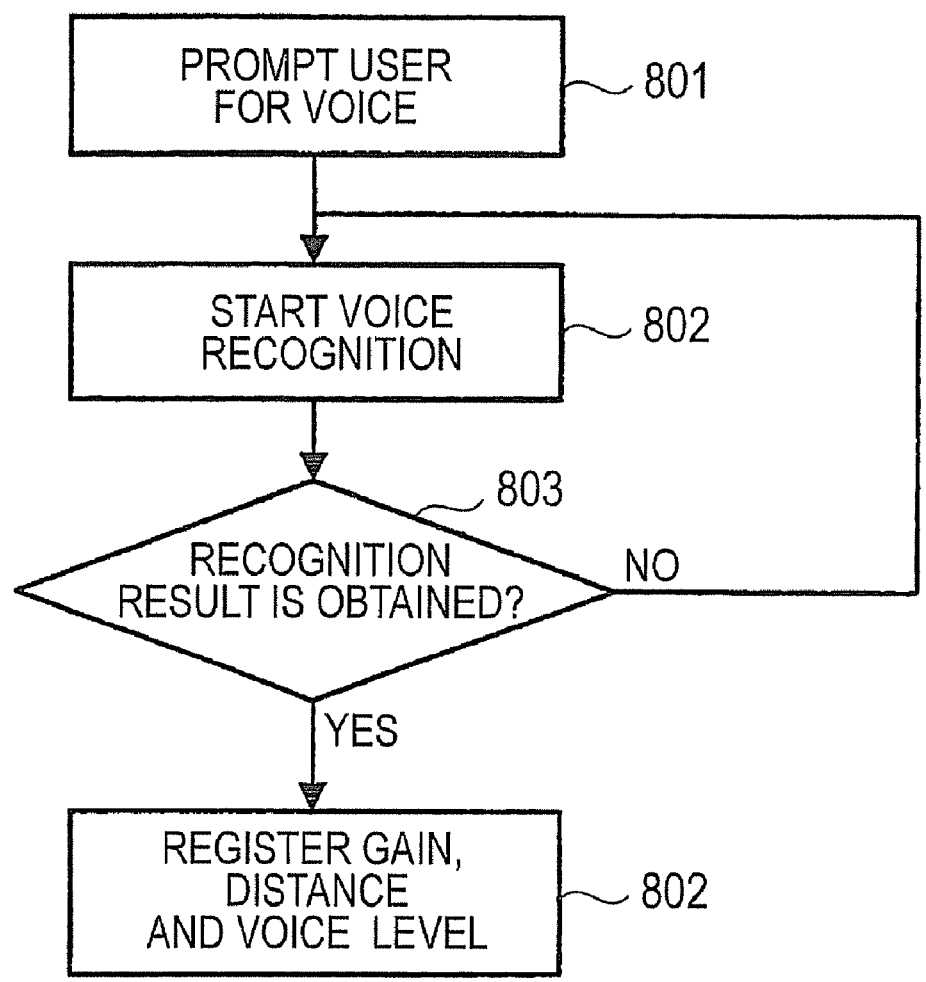
FIG. 8 is a flowchart of a voice level measurement process in a recommended distance range estimation module.

FIG. 8 is a flowchart showing the step 402 of measuring the voice level of the user 201.

In Step 801, the user 201 is prompted for voice to measure the voice level of the user 201. The recommended distance range notification module 309 is instructed to notify a voice request to the user 201. The notification for notifying the voice request may be made, by the action of the movable member 107 as shown in section (B) in FIG. 14, an indication on the indicator 106, the voice output by the voice synthesis module, or the request by a text message displayed on a display screen, for example.

In Step 802, the voice recognition module 302 waits for the voice from the user 201 and performs the voice recognition when the voice is received.

In Step 803, when the voice recognition module 302 succeeds in the voice recognition, the process proceeds to step 804 to calculate the voice level. When the voice recognition module 302 fails in the voice recognition, the process returns to step 802 to wait for the voice made by the user 201.

In Step 804, the recommended distance range estimation module 307 records the voice level V acquired from the level measurement module 305, the gain G of the voice input module 301 and the distance D acquired from the user distance measurement module 304 in the user voice level DB 306, and the process returns to step 401.

Figure 9:
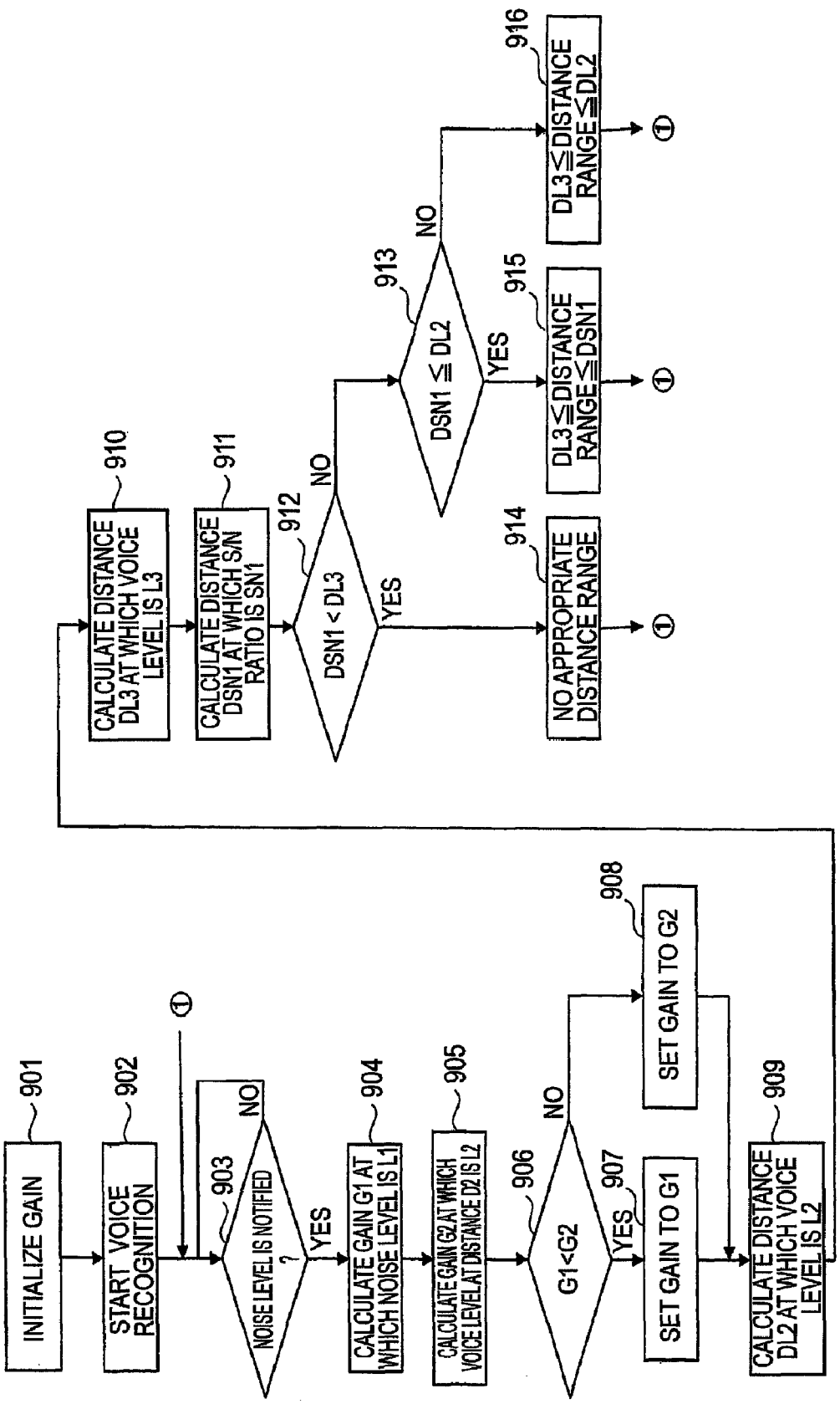
FIG. 9 is a flowchart for adjusting a gain by the recommended distance range estimation module and for calculating a recommended distance range.

FIG. 9 is a flowchart showing a detail of the step 403. The gain adjustment according to the noise level, the suitable distance calculation from the microphone and the notification of distance information to the recommended distance range notification module 309 are performed, using the voice level information of the user 201 recorded in the user voice level DB 306.

In Step 901, the gain of the voice input module 301 is initialized. The gain G0 is set, provided that the gain value when the voice interactive robot 100 is stopped at the previous time or the gain value where the current noise level is less than L1 is the initial value.

In Step 902, the voice recognition module 302 is instructed to start the voice recognition process.

In Step 903, the operation waits until the noise level is notified from the level measurement module 305, and when the noise level is notified, the process proceeds to step 904.

In Step 904, the gain G1 at which the noise level L1 is attained is calculated from the notified noise level N0 and the current gain G0. Herein, as the gain can be adjusted linearly with the level of output signal from the voice input module 301, the gain G1 can be obtained by the following Expression (3).

$$G1 = G0 \times L1/N0 \quad (3)$$

In Step 905, the user distance measurement module 304 measures the current distance D2 between the user 201 and the voice interactive robot 100. The gain G2 at which the voice level of voice from the user 201 is the minimum voice level L2 required for voice recognition is obtained by the following Expression (4) from the Expression (1).

$$G2 = G \times (L2/V) \times (D2/D)^2 \quad (4)$$

In Step 906, a comparison between G1 and G2 is made.

When G1 is smaller than G2, the gain Gi of the voice input module 301 is set to G1 in Step 907.

When G2 is smaller than G1, the gain Gi of the voice input module 301 is set to G2 in Step 908.

According to the process described above, the gain adjustment is performed.

In Step 909, the distance range for obtaining the voice level suitable for voice recognition is calculated. First, the distance DL2 that provides the lower limit value L2 of the voice level for voice required for voice recognition is calculated by the Expression (2). When the gain is adjusted to G2 at step 908, the current distance D2 is set to DL2.

In Step 910, the distance DL3 that provides the upper limit value L3 of the voice level required for voice recognition is calculated by the Expression (2).

In Step 911, the distance DSN1 at which the S/N ratio is SN1 is calculated. The gain after change, which is compared at step 906 and changed, is set to GN. Also, the S/N ratio is calculated by 20 log 10 (S/N). As the gain before change is G0, the gain after change is GN, the noise level is N, the voice level is S, the S/N ratio is calculated by 20 log 10 (S/N), the S is calculated from the Expression (1), and the noise level is linear with the gain as in the Expression (3), DSN1 is calculated from the following Expression (5).

$$S = V \times (GN/G) \times (D/DSN1)^2$$

$$N = N0 \times (GN/G0)$$

$$S/N = (V/N0) \times (G0/G) \times (D/DSN1)^2$$

$$SN1 = 20 \log 10\ (S/N)$$

$$DNS1 = sqrt((V/N0) \times (G0/G)/ln\ 10\ (SN1/20))) \times D \quad (5)$$

The recommended distance range suitable for voice recognition is from DL3 to DL2, and required to satisfy the range of DSN1 or less. If determined in Step 912 that DSN1<DL3 is satisfied, the process proceeds to Step 914, and otherwise the process proceeds to Step 913.

In Step 913, when determined that DSN1≦DL2 is satisfied, the process proceeds to Step 915, and otherwise the process proceeds to Step 916.

In Step 914, since the noise is too large, even if the user comes closer to the distance at which the voice level of voice is L3, the SN1 that is the required S/N ratio can not be satisfied. Therefore, no recommended distance range is notified to the recommended distance range notification module 309 and the process returns to step 903.

In Step 915, since the noise is large, it is necessary that the voice level is larger than L2 to satisfy the SN1 that is the required S/N ratio. Therefore, the recommended distance range suitable for voice is from DL3 to DSN1. The recommended distance range estimation module 307 notifies the obtained recommended distance range to the recommended distance range notification module 309, and the process returns to step 903.

In Step 916, when the noise is small and the voice level is larger than or equal to L2, the required S/N ratio is satisfied, whereby the recommended distance range suitable for voice is from DL3 to DL2. The recommended distance range estimation module 307 notifies the obtained recommended distance range to the recommended distance range notification module 309, and the process returns to step 903.

Figure 10:
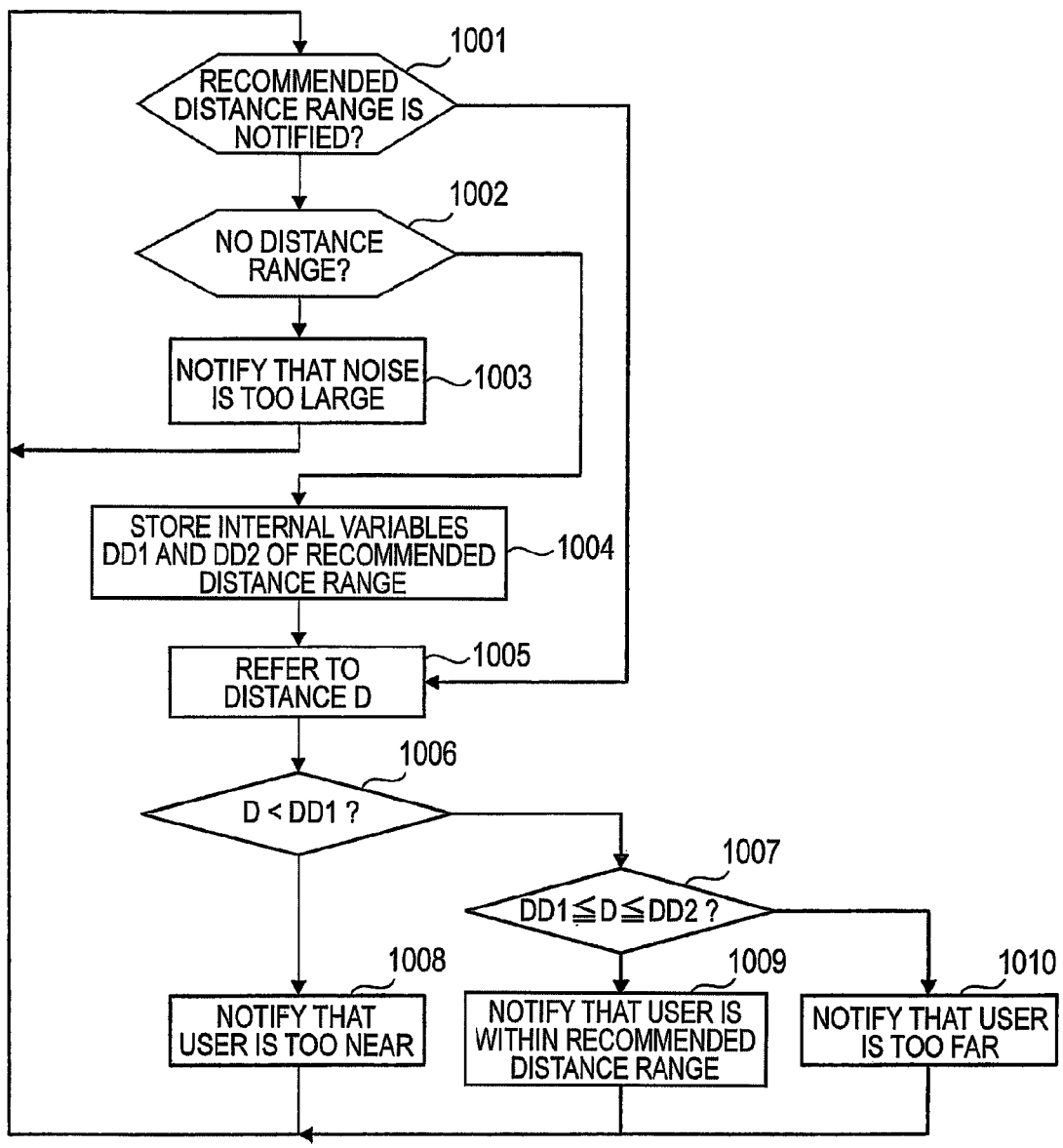
FIG. 10 is a flowchart of a process performed by a recommended distance range notification module.

FIG. 10 is a flowchart showing the operation of the recommended distance range notification module 309 to notify information of the recommended distance range notified from the recommended distance range estimation module 307 to the user 201.

In Step 1001, when there is notification of the recommended distance range from the recommended distance range estimation module 307, the process proceeds to step 1002. When there is no update notification of the recommended distance range, the process proceeds to step 1005.

In Step 1002, when it is notified that no recommended distance range exists, the process proceeds to step 1003, or if there is the recommended distance range, the process proceeds to step 1004.

In Step 1003, a notification that the noise is so large that the recommended distance range capable of voice recognition does not exist is notified to the user 201, and the process returns to step 1001. For example, it is represented with a gesture as shown in FIG. 14C, displayed on the indicator 106, or output by synthesized voice.

In Step 1004, the lower limit value of the recommended distance range notified by the recommended distance range estimation module 307 is stored as an internal variable DD1 and the upper limit value is stored as an internal variable DD2. Also, if the upper limit value and the lower limit value of the recommended distance range are already stored, the internal variables (lower limit value DD1 and upper limit value DD2) of the distance range newly notified from the recommended distance range estimation module 307 are updated and stored.

In Step 1005, information of the current distance D between the user 201 and the voice interactive robot 100 is acquired from the user distance measurement module 304.

In Step 1006, when the current distance D is smaller than DD1, the user 201 is positioned nearer than the recommended distance range suitable for voice, whereby the process proceeds to step 1008, otherwise, the process proceeds to step 1007.

In Step 1007, when the current distance D is within the recommended distance range, the distance range between the user 201 and the voice interactive robot 100 is proper, whereby the process proceeds to step 1009, otherwise, the user 201 is positioned beyond the recommended distance range, whereby the process proceeds to step 1010.

In Step 1008, a notification notifying the user 201 that the user 201 is positioned too near to the robot 100 is made, and the process returns to step 1001. For example, the notification may be made by a gesture as shown in section (C) in FIG. 14, displayed with a bar 1305 designating the position in an area 1301 on the indicator 106 as shown in FIG. 13, or be made by a synthetic voice output.

In Step 1009, an indication that the user 201 is positioned within the recommended distance range suitable for voice recognition is notified, and the process returns to step 1001. For example, the notification may be made by a gesture as shown section (B) in FIG. 14, displayed with a bar 1305 designating the position in an area 1302 on the indicator 106 as shown in FIG. 13, or be made by a synthetic voice output.

In Step 1010, a notification notifying the user 201 that the user 201 is positioned too far from the robot 100 is made, and the process returns to step 1001. For example, the notification may be made by a gesture as shown in section (A) in FIG. 14, displayed with a bar 1305 designating the position in an area 1303 on the indicator 106 as shown in FIG. 13, or be made by a synthetic voice output.

As described above, the voice interactive robot 100 can notify the distance suitable for voice to the user 201 in accordance with a change in the noise level and the voice level of voice of the user 201 at the normal time. The user can make voice while confirming the recommended distance range and the current distance without confirming the appropriate voice level or distance by repeating the voice as conventionally. Thereby, the user 201 knows whether or not the user is positioned within the recommended distance range depending on the noise level, or how far the user should move to enter the recommended distance range. Therefore, it is possible to support the user to make voice from the recommended distance range suitable for voice to satisfy the voice recognition accuracy to improve the voice recognition rate.

Though the recommended distance range suitable for voice is estimated and notified to the user in the first embodiment, a function of enabling the voice interactive robot 100 to move into the calculated recommended distance range may be provided.

Second Embodiment

A voice interactive robot according to a second embodiment will be described below.

Figure 11:
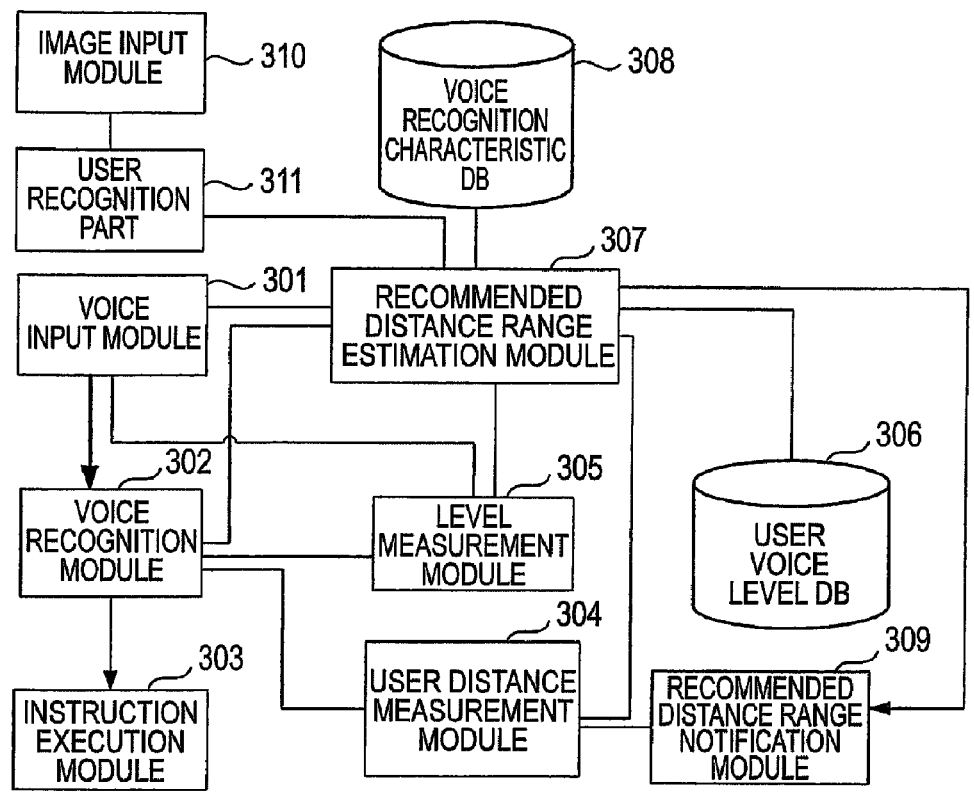
FIG. 11 is a block diagram showing a configuration including a process for user identification according to a second embodiment.

FIG. 11 is a functional block diagram of the voice interactive robot according to the second embodiment.

The voice interactive robot 100 according to the second embodiment further has a function of identifying the user, and is characterized in that the DB for use is switched for each of the identified users.

As shown in FIG. 11, the voice interactive root 100 is provided with an image input module 310 and a user identification module 311.

The image input module 310 includes the image pickup device 101, 102. An image of the user 201 in front of the voice interactive robot 100 is captured and output as input image data by the image pickup device 101.

The user identification module 311 identifies the user 201 from the image inputted from the image input module 310. The user identification module 311 may use a direct method for identifying the user by performing a face recognition process to recognize the face of the user 201, or an indirect method for identifying the user by recognizing a direction where the voice interactive robot 100 is oriented from the features of the background image. The user identification module 311 performs a user identification process at every given time period, and notifies the ID representing the user 201 to the recommended distance range estimation module 307.

Figure 12:
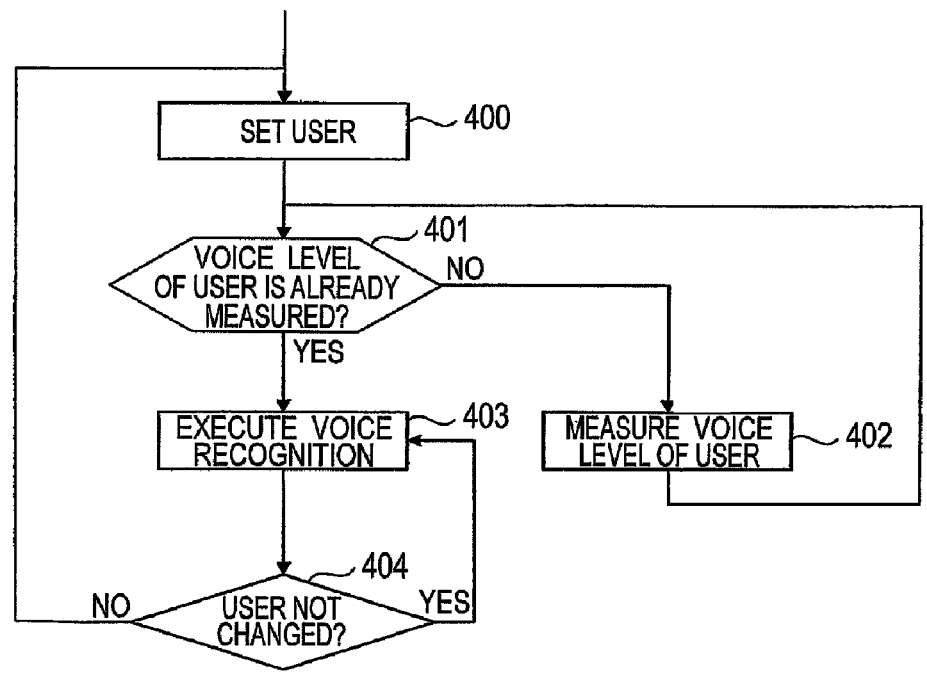
FIG. 12 is a flowchart of a process by the recommended distance range estimation module including the user identification.

FIG. 12 is a flowchart showing a process of the recommended distance range estimation module 307 for the voice interactive robot 100 according to the second embodiment.

In Step 400, the user ID of the user 201 is set as an internal variable by referring to the notification from the user identification module 311.

In Step 401, it is determined whether or not the voice level of the user 201 is already measured. Whether or not there is voice level information with the user ID is checked by referring to the user voice level DB 306, in which if the voice level information of the designated ID is not registered, the process proceeds to step 402, or if it is registered, the process proceeds to step 403.

In Step 402, the voice level of the user 201 is measured, in which the obtained set (G, D, V) is registered in the user voice level DB 306 with the user ID as the retrieval key. The process returns to step 401.

In Step 403, the gain adjustment according to the noise level and the suitable distance calculation from the microphone are performed using the voice level information of the user 201, whereby the distance information is notified to the recommended distance range notification module 309.

In Step 404, it is checked whether or not the user ID notified from the user identification module 311 is unchanged from the user ID saved as the internal variable. If the user ID is changed, the process proceeds to step 400, or if the user ID is unchanged, the process proceeds to step 403.

According to the voice interactive robot 100 of the second embodiment, even if a plurality of users use the voice interactive robot 100 and the voice level of voice is different for each user, the appropriate distance range for each user can be estimated. The recommended distance range suitable for voice is estimated, and notified to the user 201, whereby the user 201 knows whether or not the user is within the recommended distance range depending on the noise level, or how far the user should move to enter the recommended distance range. Thereby, it is possible to support the user to make voice from the recommended distance range suitable for voice to satisfy the voice recognition accuracy to improve the voice recognition rate.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. A voice recognition apparatus comprising:
   an audio input module that receives an audio input and outputs an audio signal, the audio input module having a gain being configured to be adjustable;
   a voice recognition module that detects a voice period, where a voice activity by a user is detected in the audio signal and performs a voice recognition for the audio signal during the voice period;
   a first level measurement module that measures a voice level of the audio signal in the voice period and outputs the voice level;
   a second level measurement module that measures a noise level of the audio signal in a noise period and outputs the noise level, the noise period being a time period except the voice period;
   a first calculation module that calculates an S/N ratio that is a ratio of the voice level to the noise level;
   a distance measurement module that measures a current distance between the user and the audio input module;
   a first memory module that stores a first threshold corresponding to an S/N ratio at which the voice recognition module is capable to perform the voice recognition with a given recognition rate;
   a second memory module that stores a voice characteristic having a set of the voice level, the current distance and the gain, by which the voice recognition module has succeeded in performing the voice recognition;
   a second calculation module that calculates a recommended distance range based on the voice characteristic, the recommended distance range indicating a distance range of the user and the audio input module at which the S/N ratio exceeds the first threshold; and
   a display module that displays the recommended distance range and the current distance.

2. The apparatus according to claim 1 further comprising a third memory module that stores a second threshold corresponding to an upper limit of the audio signal permissible to be output from the audio input module,
   wherein the second calculation module calculates the recommended distance range by calculating a distance range, in which being estimated that the voice level unexceeds the second threshold, based on the voice characteristic and the gain and setting the calculated distance range as the recommended distance range.

3. The apparatus according to claim 2 further comprising:
   a fourth memory module that stores a third threshold corresponding to an upper limit of the noise level permissible in the audio signal; and
   a control module that controls the gain of the voice recognition module to control the noise level to unexceed the third threshold.

4. The apparatus according to claim 3 further comprising:
   a determination module that determines whether the current distance is within the recommended distance range; and
   a notification module that notifies to the user a result of the determination by the determination module.

5. The apparatus according to claim 1, wherein the second memory module stores the voice characteristic for each of a plurality of users with an identification information that is unique to each of the users.

6. The apparatus according to claim 5, wherein the second calculation module calculates the recommended distance range based on the voice characteristic specified by a given identification information.

7. The apparatus according to claim 6 further comprising a user identification module that identifies the user by whom the voice is made and obtains the identification information corresponding to the identified user,
   wherein the second calculation module calculates the recommended distance range based on the voice characteristic specified by the identification information obtained by the user identification module.

8. A method for performing a voice recognition, the method comprising:
- receiving an audio input to output an audio signal with a gain being configured to be adjustable;
- detecting a voice period, where a voice activity by a user is detected in the audio signal to perform the voice recognition for the audio signal during the voice period;
- measuring a voice level of the audio signal in the voice period to output the voice level;
- measuring a noise level of the audio signal in a noise period to output the noise level, the noise period being a time period except the voice period;
- calculating an S/N ratio that is a ratio of the voice level to the noise level;
- measuring a current distance from the user;
- storing a first threshold corresponding to an S/N ratio at which the voice recognition is capable to be performed to have a given recognition rate;
- storing a voice characteristic having a set of the voice level, the current distance and the gain, by which the voice recognition has been succeeded;
- calculating a recommended distance range based on the voice characteristic, the recommended distance range indicating a distance range of the user and an audio input module at which the S/N ratio exceeds the first threshold; and
- displaying the recommended distance range and the current distance.

* * * * *